US012711558B2

(12) United States Patent
Jolodosky et al.

(10) Patent No.: US 12,711,558 B2
(45) Date of Patent: Aug. 18, 2026

(54) SYSTEMS AND METHODS FOR OPTIMIZING ENERGY DISPATCH

(71) Applicant: FLUENCE ENERGY, LLC, Arlington, VA (US)

(72) Inventors: Alejandra Jolodosky, Washington, DC (US); Colleen Lueken, Arlington, VA (US); Abhishek Malik, Pittsburgh, PA (US); Steven M. Hay, Berkeley Springs, WV (US); Tianyi Wei, Frisco, TX (US); Richard J. Prevost, Jr., Herndon, VA (US)

(73) Assignee: FLUENCE ENERGY, LLC, Arlington, VA (US)

( * ) Notice: Subject to any disclaimer, the term of this patent is extended or adjusted under 35 U.S.C. 154(b) by 619 days.

(21) Appl. No.: 18/163,540

(22) Filed: Feb. 2, 2023

(65) Prior Publication Data

US 2024/0265474 A1 Aug. 8, 2024

(51) Int. Cl.
*G06Q 50/06* (2024.01)
*H02J 3/00* (2026.01)
(Continued)

(52) U.S. Cl.
CPC .............. *G06Q 50/06* (2013.01); *H02J 3/003* (2020.01); *H02J 3/32* (2013.01); *H02J 7/84* (2026.01)

(58) Field of Classification Search
None
See application file for complete search history.

(56) References Cited

U.S. PATENT DOCUMENTS 5,924,486 A * 7/1999 Ehlers ...................... F24F 11/62 165/238
7,343,360 B1 * 3/2008 Ristanovic ............. G06Q 50/06 705/412

(Continued)

FOREIGN PATENT DOCUMENTS

CA 3081764 A1 * 5/2019 ........... G05B 13/027
CA 3179669 A1 * 10/2022 ........... G06Q 10/063

(Continued)

OTHER PUBLICATIONS

Abdullah et al., "An Effective Power Dispatch Control Strategy to Improve Generation Schedulability and Supply Reliability of a Wind Farm Using a Battery Energy Storage System", Dec. 2013, IEEE Transactions on Sustainable Energy, vol. 6, No. 3. (Year: 2013).*

(Continued)

*Primary Examiner* — Mohammad Ali
*Assistant Examiner* — Kelvin Booker
(74) *Attorney, Agent, or Firm* — Buchanan Ingersoll & Rooney PC

(57) ABSTRACT

Methods, systems, apparatuses, and non-transitory computer-readable media are provided for optimizing energy dispatch. In one implementation, the computer-readable media includes instructions to cause a processor to: generate a plurality of energy dispatch patterns for utilizing one or more energy storage units; generate, based on data determined for each energy dispatch pattern of the plurality of energy dispatch patterns, a recommended energy dispatch pattern; and adjust the one or more energy storage units to dispatch electricity according to the recommended energy dispatch pattern.

19 Claims, 7 Drawing Sheets

(51) Int. Cl.

| | |
|---|---|
| ***H02J 3/32*** | (2026.01) |
| ***H02J 7/00*** | (2026.01) |
| ***H02J 7/84*** | (2026.01) |

(56) References Cited

U.S. PATENT DOCUMENTS

| | | | | |
|---|---|---|---|---|
| 7,844,370 | B2 * | 11/2010 | Pollack | B60L 53/64 315/80 |
| 7,949,435 | B2 * | 5/2011 | Pollack | B60L 53/20 315/80 |
| 8,000,913 | B2 * | 8/2011 | Kreiss | G06Q 50/06 702/58 |
| 8,639,392 | B2 * | 1/2014 | Chassin | G06Q 30/08 705/26.4 |
| 8,706,650 | B2 * | 4/2014 | Ozog | H02J 3/008 705/400 |
| 8,866,408 | B2 * | 10/2014 | Chemel | H05B 47/155 315/297 |
| 2008/0039989 | A1 * | 2/2008 | Pollack | G06Q 50/06 701/22 |
| 2008/0040223 | A1 * | 2/2008 | Bridges | B60L 53/64 705/40 |
| 2008/0040295 | A1 * | 2/2008 | Kaplan | B60L 53/64 705/412 |
| 2009/0038668 | A1 * | 2/2009 | Plaisted | H10F 77/68 700/274 |
| 2009/0043520 | A1 * | 2/2009 | Pollack | B60L 3/12 705/400 |
| 2011/0015802 | A1 * | 1/2011 | Imes | G05D 23/1923 700/300 |
| 2013/0118173 | A1 * | 5/2013 | Cardoso | F03D 9/17 60/698 |
| 2013/0218548 | A1 * | 8/2013 | Lazaris | F03G 6/00 703/18 |
| 2013/0274935 | A1 * | 10/2013 | Deshpande | H02J 3/28 700/291 |
| 2014/0277797 | A1 * | 9/2014 | Mokhtari | G06Q 30/0202 700/291 |
| 2016/0007426 | A1 * | 1/2016 | Ashdown | H05B 47/11 700/90 |
| 2016/0226243 | A1 * | 8/2016 | Djan-Sampson | H02J 3/28 |
| 2017/0192406 | A1 * | 7/2017 | Ashdown | G06F 30/20 |

FOREIGN PATENT DOCUMENTS

| | | | | | |
|---|---|---|---|---|---|
| CN | 102498448 | A | * | 6/2012 | G05D 23/1923 |
| CN | 106058918 | A | * | 10/2016 | G06Q 50/06 |
| CN | 106203674 | A | * | 12/2016 | G06N 3/12 |
| CN | 104836259 | B | * | 4/2017 | H02J 13/00 |
| CN | 107171435 | A | * | 9/2017 | H02J 3/18 |
| CN | 107292488 | A | * | 10/2017 | G06Q 50/06 |
| CN | 108599156 | A | * | 9/2018 | H02J 13/00 |
| CN | 108692818 | A | * | 10/2018 | G01J 5/00 |
| CN | 113342820 | A | * | 9/2021 | G06F 16/2255 |
| EP | 2081273 | A2 | * | 7/2009 | G06Q 50/06 |
| KR | 101953014 | B1 | * | 5/2019 | G06Q 50/06 |
| KR | 102597937 | B1 | * | 11/2023 | H02J 3/383 |

OTHER PUBLICATIONS

Wei et al., "Impact of Energy Storage on Economic Dispatch of Distribution Systems: A Multi-Parametric Linear Programming Approach and Its Implications", Feb. 2020, IEEE Open Access Journal of Power and Energy, vol. 7. (Year: 2020).*

Nottrott et al., "Energy dispatch schedule optimization and cost benefit analysis for grid-connected, photovoltaic-battery storage systems", Apr. 2012, Renewable Energy 55 (2013). (Year: 2012).*

Hanna et al., "Energy dispatch schedule optimization for demand charge reduction using a photovoltaic-battery storage system with solar forecasting", Sep. 2013, Solar Energy 103 (2014) 269-287. (Year: 2013).*

Ho et al., "Optimal scheduling of energy storage for renewable energy distributed energy generation system", Mar. 2015, RenewableandSustainableEnergyReviews58(2016)1100-1107. (Year: 2015).*

Haddadiana, et al., "Optimal scheduling of distributed battery storage for enhancing the security and the economics of electric power systems with emission constraints", May 2014, Electric Power Systems Research 124 (2015) 152-159. (Year: 2014).*

Guo et al., "Optimisation methods for dispatch and control of energy storage with renewable integration", Dec. 2021, IET Smart Grid. (Year: 2021).*

Gitizadeh et al., "Battery capacity determination with respect to optimized energy dispatch schedule in grid-connected photovoltaic (PV) systems", Oct. 2013, Energy 65 (2014). (Year: 2013).*

Chaurasia et al., "Technical, economic, and environmental performance comparison analysis of a hybrid renewable energy system based on power dispatch strategies", Jul. 2021, Sustainable Energy Technologies and Assessments 53 (2022) 102787. (Year: 2021).*

Yu et al., "Big Data Analytics in Power Distribution Systems", 2015, IEEE. (Year: 2015).*

Byun et al., "A Smart Energy Distribution and Management System for Renewable Energy Distribution and Context-aware Services based on User Patterns and Load Forecasting", May 2011, IEEE Transactions on Consumer Electronics, vol. 57, No. 2. (Year: 2011).*

Kuo et al., "Wind energy dispatch considering environmental and economic factors", 2010, Renewable Energy 35 (2010) 2217e2227 (Year: 2010).*

Lyu et al., "Optimal Energy Dispatch of Energy Storage System as a Shared Infrastructure between DC Railway Network and DC Micro Grid", 2022, IEEE. (Year: 2022).*

Zabian et al., "Data-driven Modelling and Optimized Management of the District Cooling System and Thermal Energy Storage in Gothenburg", 2022, Chalmers University of Technology Gothenburg, Sweden. (Year: 2022).*

Ho et al., "Optimal scheduling of energy storage for renewable energy distributed energy generation system", RenewableandSustainableEnergyReviews58(2016)1100-1107 (Year: 2016).*

Zheng et al., "Economic and environmental benefits of coordinating dispatch among distributed electricity storage", Applied Energy 210 (2018) 842-855. (Year: 2018).*

Zakariazadeh et al., "Economic-environmental energy and reserve scheduling of smart distribution systems: A multiobjective mathematical programming approach", Jun. 2013, Energy Conversion and Management 78 (2014) 151-164. (Year: 2013).*

Byun et al., "A Smart Energy Distribution and Management System for Renewable Energy Distribution and Context-aware Services based on User Patterns and Load Forecasting", IEEE Transactions on Consumer Electronics, vol. 57, No. 2, May 2011. (Year: 2011).*

* cited by examiner

SYSTEMS AND METHODS FOR OPTIMIZING ENERGY DISPATCH

TECHNICAL FIELD

The present disclosure generally relates to the field of energy storage. More specifically, the present disclosure relates to optimizing energy dispatch and anomaly detection in energy storage systems.

BACKGROUND

Energy storage systems may receive, store, and output energy. The energy storage system may, for example, be connected to an electrical grid, a power station, a building, or any other type of facility, and may receive and store energy and provide energy at a later time. An operator of an energy storage system may configure how the energy storage system operates. Improper configuration of the energy storage system may result in undesirable rates of degradation of the energy sources in the energy storage system. For example, when the rate or time for which energy is received or output by an energy storage system is not configured efficiently, the energy storage system may be subject to unnecessary degradation and/or may result in reduction in an overall life of the energy storage system.

Therefore, there is a need for systems and methods directed to improving the efficiency of using energy storage systems to input or output energy, for example, by assessing multiple generated energy dispatch patterns, as described in greater detail herein.

SUMMARY

Disclosed embodiments may relate to energy storage systems. Embodiments consistent with the present disclosure provide systems, methods, and apparatuses associated with energy storage.

Disclosed embodiments may include systems, methods, apparatuses, and non-transitory computer-readable media for optimizing energy dispatch. For example, disclosed embodiments may include: generating, by a computing device, a plurality of energy dispatch patterns for utilizing one or more energy storage units; generating, based on data determined for each energy dispatch pattern of the plurality of energy dispatch patterns, a recommended energy dispatch pattern; and adjusting the one or more energy storage units to dispatch electricity according to the recommended energy dispatch pattern. Some of these embodiments may include, for each energy dispatch pattern of the plurality of energy dispatch patterns: determining, based on forecasted energy market data, an estimated value of the energy dispatch pattern; determining, based on environmental data for the one or more energy storage units, one or more state variables of the one or more energy storage units; determining, based on the one or more state variables, an estimated marginal degradation of the one or more energy storage units; determining, based on the estimated marginal degradation, an estimated cost of the energy dispatch pattern; and calculating, based on the estimated value and the estimated cost, an estimated net value of the energy dispatch pattern. Some of these embodiments may include generating, based on estimated net values for the plurality of energy dispatch patterns, the recommended energy dispatch pattern.

Disclosed embodiments may include systems, methods, apparatuses, and non-transitory computer-readable media for anomaly detection in energy storage systems. Some of these embodiments may include: receiving, by a computing device, usage data of a battery located within one or more energy storage units during a time period; inputting the usage data to a machine learning model; generating, based on processing of the usage data by the machine learning model, a predicted temperature of the battery at the end of the time period; receiving, from a temperature sensor of the battery, a measured temperature of the battery at the end of the time period; determining a difference between the predicted temperature and the measured temperature; based on the determined difference, sending an indication of a state of the battery; and based on the state of the battery, configuring usage of the battery. Some of these embodiments may include: based on the difference satisfying a threshold, sending an indication that an anomaly of the battery is detected; and based on detecting the anomaly of the battery, adjusting usage of the battery.

Consistent with disclosed embodiments, non-transitory computer-readable media may store instructions that, when executed by at least one processor, may cause the at least one processor to perform any of the processes described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
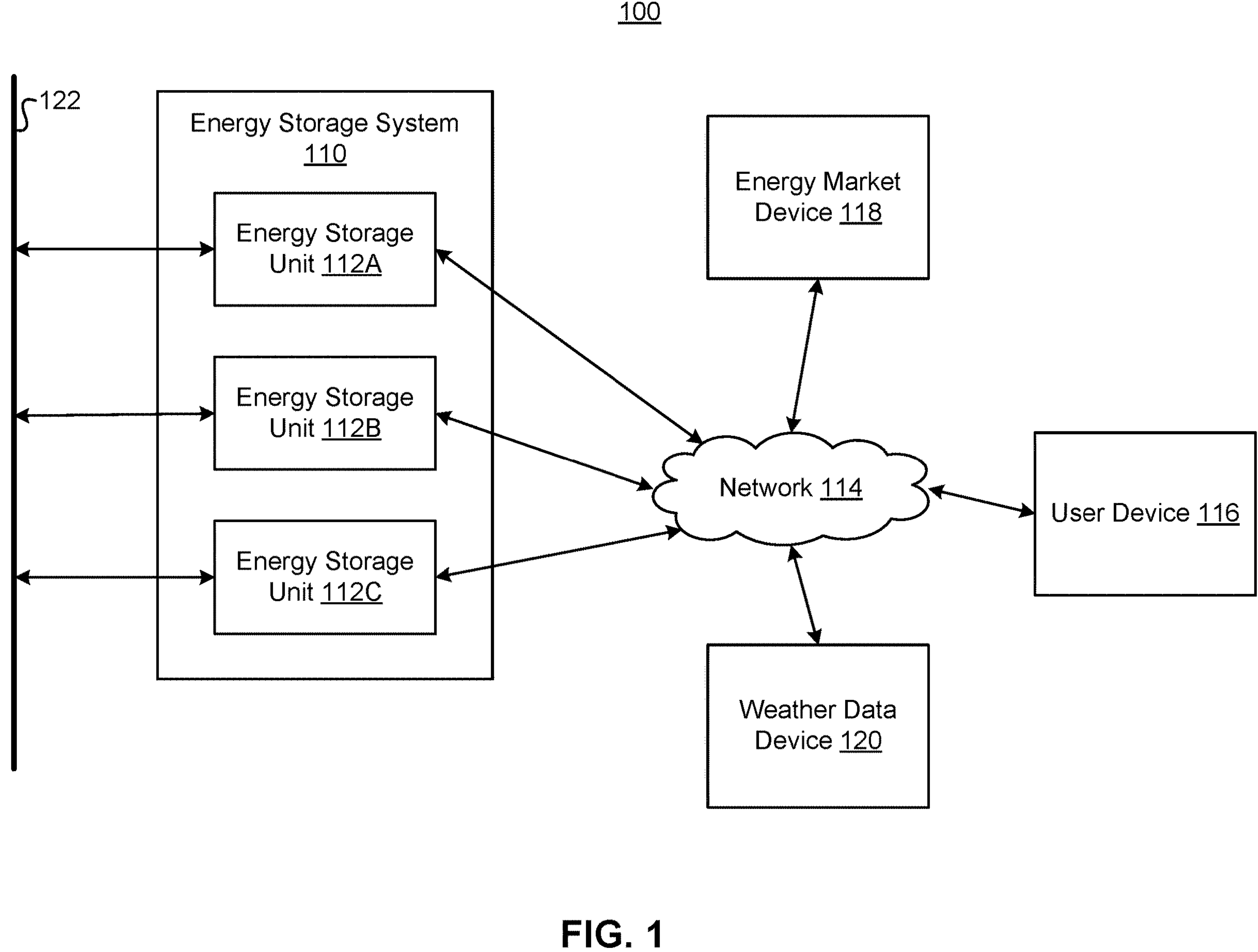
FIG. 1 shows an example system for managing an energy storage system, consistent with some embodiments of the present disclosure.

The following detailed description refers to the accompanying drawings. Wherever possible, the same reference numbers are used in the drawings and the following description to refer to the same or similar parts. While several illustrative embodiments are described herein, modifications, adaptations, and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the specific embodiments and examples, but is inclusive of general principles described herein and illustrated in the figures in addition to the general principles encompassed by the appended claims.

FIG. 1 shows an example system 100 for managing an energy storage system, consistent with some embodiments of the present disclosure. System 100 may include an energy storage system 110, a network 114, a user device 116, an energy market device 118, a weather data device 120, and one or more power lines (e.g., a power line 122). The energy storage system 110 may include one or more energy storage units (e.g., 112A, 112B, and 112C).

The network 114 may include one or more of any of various types of networks for communication of information, such as a cellular network (e.g., 2G, 3G, 4G, or 5G), a satellite network, a Wi-Fi network, a WiMAX network, a Bluetooth network, a near-field communication (NFC) network, a low-power wide-area networking (LPWAN) network, a mobile network, a terrestrial microwave network, a wireless ad hoc network, an Ethernet network, a telephone network, a power-line communication (PLC) network, a coaxial cable network, an optical fiber network, and/or the like. The network 114 may include a wired network or a wireless network. The network 114 may include a personal area network, a local area network, a metropolitan area network, a wide area network, a global area network, a space network, or any other type of computer network that may use data connections between network nodes. In some examples, the network 114 may include an Internet Protocol (IP) based network. The network 114 may use interconnected communication links to connect the energy storage units 112A, 112B, 112C, the user device 116, the energy market device 118, and/or the weather data device 120.

The energy storage system 110 may refer to any system configured to store energy. The energy storage system 110 may include a centralized system or a distributed system. The energy storage system 110 may include one or more energy storage units (e.g., 112A, 112B, and 112C). In some examples, the energy storage units 112A, 112B, 112C may be located in a single physical location, such as a site. In some examples, the energy storage units 112A, 112B, 112C may be distributed in multiple physical locations. The energy storage units 112A, 112B, 112C may be interconnected via a network and may be configured to function as a system.

The energy storage system 110 may be coupled to one or more power lines (e.g., the power line 122). In some examples, the power line 122 may be associated with an electrical grid. In some examples, the power line 122 may be associated with a power station (e.g., a photovoltaic power station, a solar farm, a wind power station, a wind farm, a hydroelectric power station). In some examples, the power line 122 may be associated with any type of facility (e.g., a building, a factory, a hospital, or a school). The energy storage system 110 may receive energy via the power line 122 and may store the received energy, and/or may output energy via the power line 122. For example, the energy storage system 110 may be grid energy storage within an electrical power grid. The energy storage system 110 may store electrical energy when demand for electricity is low and may output electrical energy to the grid when demand for electricity is high. As another example, the energy storage system 110 may be located next to a solar farm and may be configured to receive electrical energy from the solar farm and store the electrical energy for output at a later time. As another example, the energy storage system 110 may be located next to a facility and may be configured to store electrical energy and to provide electrical energy to the facility at an appropriate time.

The energy storage system 110 including energy storage unit(s) may store energy in one or more of various forms, such as electrochemical, chemical, mechanical, electrical, electromagnetic, biological, and/or thermal. In some examples, the energy storage system 110 including energy storage unit(s) may store energy using rechargeable batteries. An example of an energy storage unit is described in greater detail in connection with FIG. 3.

The user device 116 may include any type of computing device configured to perform one or more of the aspects described herein (e.g., for optimizing energy dispatch and/or for anomaly detection in energy storage systems). For example, the user device 116 may include at least one processor and memory storing instructions that, when executed by the at least one processor, cause the at least one processor to perform one or more of the aspects described herein. The user device 116 may include, for example, a computer, a laptop computer, a desktop computer, a mainframe computer, a tablet, a smart phone, a mobile phone, a mobile device, a server device, a client device, an automotive electronics device, an extended reality headset, a smart watch, an Internet of things (IoT) device, or any other type of computing device. In some examples, the user device 116 may be configured to receive data from various sources (e.g., via the network 114), and/or to manage the energy storage system 110. For example, the user device 116 may receive operational data of the energy storage units 112A, 112B, 112C. Additionally or alternatively, the user device 116 may receive data from the energy market device 118, including, for example, historical energy market data and/or forecasted energy market data. The energy market device 118 may include any type of computing device that may store data associated with an energy market (e.g., a wholesale energy market). Additionally or alternatively, the user device 116 may receive data from the weather data device 120, including, for example, historical weather data and/or forecasted weather data. The weather data device 120 may include any type of computing device that may store data associated with weather. Based on received data, the user device 116 may manage the energy storage system 110. For example, as described in greater detail herein, the user device 116 may optimize dispatch of energy from the energy storage units 112A, 112B, 112C, may detect anomaly in the energy storage units 112A, 112B, 112C, and/or may cause display of user interface(s) that may allow a user (e.g., an administrator for the energy storage system 110) to control the energy storage system 110.

Figure 2:
FIG. 2 shows an example computing device, consistent with some embodiments of the present disclosure.
Figure 2:
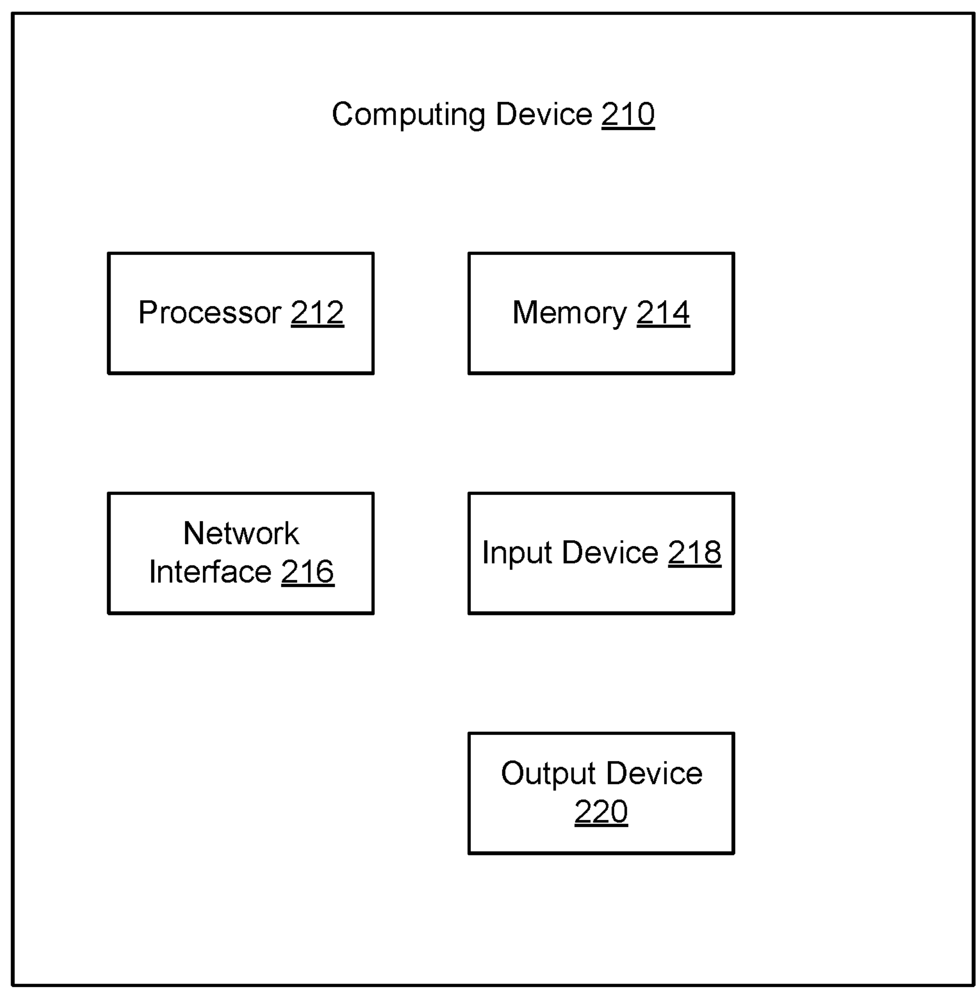

FIG. 2 shows an example computing device 210, consistent with some embodiments of the present disclosure. The computing device 210 may include, for example, at least one processor 212, at least one memory 214, at least one network interface 216, one or more input devices 218, and/or one or more output devices 220. The devices as described herein (e.g., the user device 116, the energy market device 118, and the weather data device 120 shown in FIG. 1, and the computing device 312 shown in FIG. 3) may similarly include these components and/or may be implemented in a similar manner as the computing device 210. In some examples, the computing device 210 including one or more of the components may be implemented using virtualization technologies and/or cloud computing technologies.

The processor 212 may execute instructions of a computer program to perform any of the functions described herein. The processor 212 may include, for example, integrated circuits, microchips, microcontrollers, microprocessors, central processing units (CPUs), graphics processing units (GPUs), digital signal processors (DSPs), field programmable gate arrays (FPGAs), or other units suitable for executing instructions or performing logic operations. The processor 212 may include a single-core or multiple-core processor (e.g., dual-core, quad-core, or with any desired number of cores). The processor 212 may provide the ability to execute, control, run, or store multiple processes, applications, or programs. In some examples, the processor 212 may be configured to provide parallel processing functionalities to allow a device associated with the processor to execute multiple processes simultaneously. In some examples, the processor 212 may be configured with virtualization technologies. Other types of processor arrangements may be implemented to provide the capabilities described herein.

The memory 214 may include a non-transitory computer-readable medium that may store instructions that, when executed by at least one processor, cause the at least one processor to perform one or more processes as described herein. A non-transitory computer-readable medium may include any type of physical memory on which information or data readable by at least one processor may be stored. A non-transitory computer-readable medium may include, for example, random access memory (RAM), read-only memory (ROM), compact disc read-only memory (CD-ROM), digital versatile discs (DVDs), programmable read-only memory (PROM), erasable programmable read-only memory (EPROM), non-volatile random-access memory (NVRAM), volatile memory, non-volatile memory, hard drives, flash drives, disks, caches, registers, an optical data storage medium, a physical medium with patterns, or networked versions thereof. A non-transitory computer-readable medium may include multiple structures and may be located at a local location or at a remote location.

The network interface 216 may include, for example, a network card, a modem, and/or the like, and may be configured to provide data communication (e.g., two-way data communication) with a network (e.g., the network 114). The network interface 216 may be a wireless interface, a wired interface, or a combination of the two. The specific design and implementation of the network interface 216 may depend on the communication network via which the computing device 210 is intended to operate. For example, the network interface 216 may include a Wireless Local Area Network (WLAN) card, an Integrated Services Digital Network (ISDN) card, a cellular modem, a satellite modem, a modem configured to provide data communication connections via the Internet, a network card with an Ethernet port, a device with radio frequency receivers and transmitters, a device with optical receivers and transmitters, and/or the like. In some examples, the network interface 216 may be designed to operate via the network 114. The network interface 216 may be configured to send and receive electrical, electromagnetic, or optical signals that may represent various types of data.

The input device 218 may include, for example, a keyboard, a mouse, a touch pad, a touch screen, one or more buttons, a joystick, a microphone, and/or any other device configured to detect and/or receive input. In some examples, the input device 218 may include one or more of various types of sensors, such as an image sensor, a temperature sensor, a humidity sensor, a location sensor, or any other type of sensor. The output device 220 may include, for example, a light indicator, a light source, a display (e.g., a light-emitting diode (LED) display, an organic light-emitting diode (OLED) display, a liquid-crystal display (LCD), or a dot-matrix display), a screen, a touch screen, a speaker, a headphone, a device configured to provide tactile cues, a vibrator, and/or any other device configured to provide output.

The memory 214 may store instructions that, when executed by at least one processor, cause the at least one processor to perform one or more processes as described herein. The instructions may include, for example, software instructions, computer programs, computer code, executable instructions, source code, machine instructions, machine language programs, or any other type of directions for a computing device. The instructions may be based on one or more of various types of desired programming languages, and may include (e.g., embody) various processes for optimizing energy dispatch and/or detecting anomaly in energy storage systems as described herein.

Figure 3:
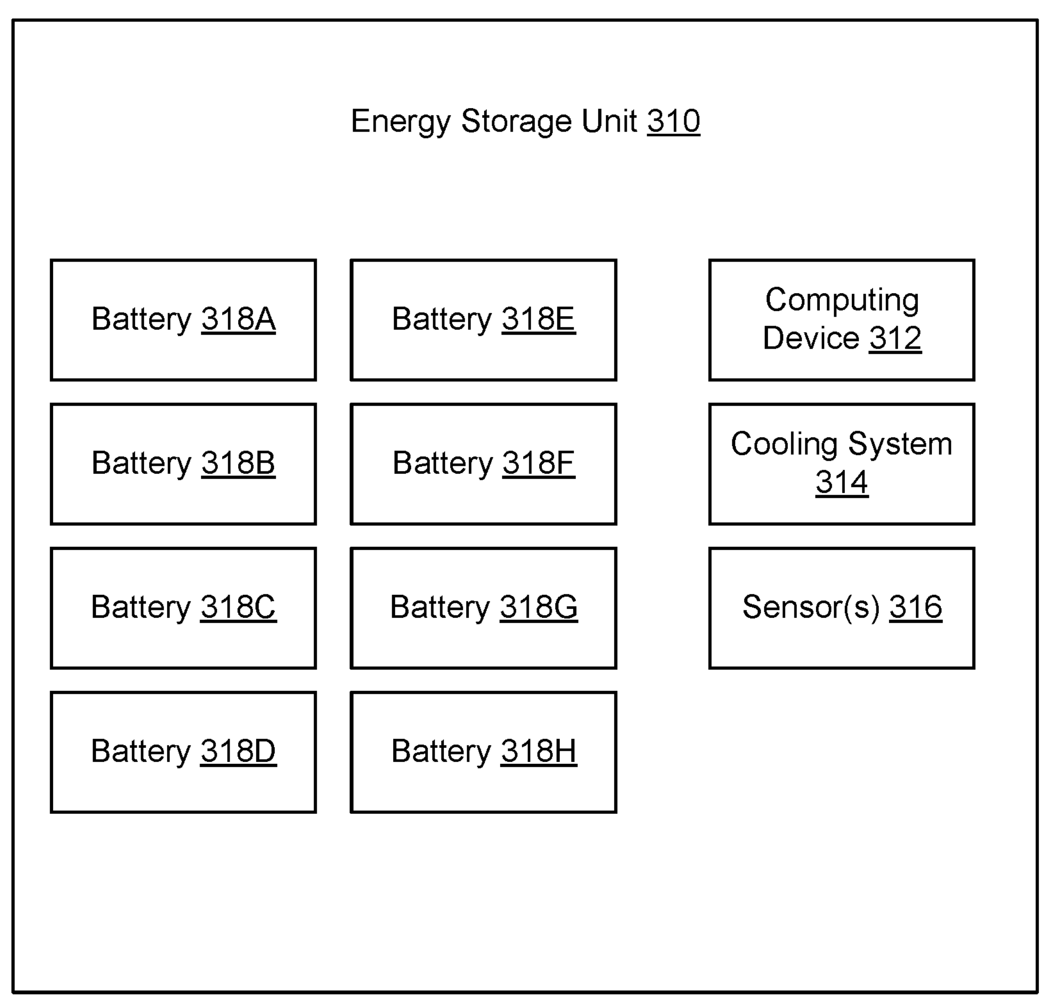
FIG. 3 shows an example energy storage unit, consistent with some embodiments of the present disclosure.

FIG. 3 shows an example energy storage unit 310, consistent with some embodiments of the present disclosure. The energy storage unit 310 may include, for example, a computing device 312, a cooling system 314, one or more sensors 316, and/or one or more batteries (e.g., 318A-318H). The energy storage unit 310 may be an example for one or more of the energy storage units 112A, 112B, 112C. In some examples, the energy storage unit 310 may have an enclosure and the components of the energy storage unit 310 may be contained within the enclosure. The enclosure may be in any desired shape, and/or may be constructed using any desired material. For example, the enclosure may have a shape of a rectangular cuboid or a cube.

The computing device 312 may be implemented in a similar manner as the computing device 210. The computing device 312 may be local to the energy storage unit 310 (e.g., located within an enclosure of the energy storage unit 310). The computing device 312 may be configured to manage other components of the energy storage unit 310. The computing device 312 may, additionally or alternatively, be configured to communicate with another computing device (e.g., the user device 116) for managing the energy storage unit 310. For example, the computing device 312 may transmit operational data of the energy storage unit 310 to the other computing device, may receive instructions from the other computing device, and may execute the received instructions.

A battery (e.g., any one of the batteries 318A-318H) may refer to an electric battery, and may include a source of electric power including one or more electrochemical cells with external connections. The batteries 318A-318H may be rechargeable, and may be discharged and recharged multiple times. The batteries 318A-318H may include one or more of various types of batteries, such as lithium-ion batteries, lithium iron phosphate batteries, silver-oxide batteries, nickel-zinc batteries, nickel metal hydride batteries, lead-acid batteries, nickel-cadmium batteries, lithium nickel manganese cobalt oxides (NMC) batteries, lithium nickel cobalt aluminium oxides (NCA) batteries, lithium ion manganese oxide (LMO) batteries, lithium cobalt oxide batteries, fuel cells, or other types of batteries. The energy storage unit 310 is illustrated to include batteries 318A-318H, but a larger or smaller number of batteries may be included in the energy storage unit 310 as desired.

The batteries 318A-318H may have control components associated therewith. The control components may be, for example, configured to manage the charge and discharge of the batteries 318A-318H. The control components may include, for example, battery management systems (BMS). In some examples, each of the batteries 318A-318H may have its control component (e.g., a battery management system). The control component for each of the batteries 318A-318H may be implemented by a computing device, and/or may communicate with a central management component (e.g., for the energy storage unit 310 and implemented by the computing device 312). Additionally or alternatively, the central management component may manage the charge and discharge of the batteries 318A-318H collectively. The charge and discharge of the batteries 318A-318H may be controlled using appropriate techniques, such as circuits with switch controls, charge or discharge controllers, charge or discharge regulators, battery regulators, and/or the like, so that the batteries 318A-318H may be controlled to be in a state of receiving electricity from a source at a particular rate, in a state of outputting electricity to a load at a particular rate, or in a state of being idle.

The cooling system 314 may include any type of device configured to remove heat from the energy storage unit 310. The cooling system 314 may use air, liquid, and/or any other type of suitable medium or material to remove heat. In some examples, the cooling system 314 may include heat sinks and/or cooling fins. In some examples, the cooling system 314 may include fans (e.g., for moving air in air-cooling), pumps (e.g., for moving a liquid in liquid-cooling), compressors (e.g., for vapor-compression refrigeration), or any other type of device for cooling. The cooling system 314 may use any type of desired configuration, placement, and/or distribution. In some examples, each of the batteries 318A-318H may have its individually associated cooling element as part of the cooling system 314.

The one or more sensors 316 may include any type of sensor configured to gather information associated with (e.g., measure the operation of) the energy storage unit 310. For example, the sensor(s) 316 may include temperature sensors, humidity sensors, location sensors, current sensors, voltage sensors, and/or other types of sensors. The sensor(s) 316 may use any type of desired configuration, placement, and/or distribution. In some examples, each of the batteries 318A-318H may have its individually associated sensor(s). In some examples, the energy storage unit 310 may include sensor(s) that may be applicable to the batteries 318A-318H collectively.

The computing device 312 may communicate with and control the batteries 318A-318H (e.g., via a control component for each battery), the cooling system 314, and the sensor(s) 316. In some examples, the computing device 312 may control the components based on instructions from another computing device (e.g., the user device 116). Additionally or alternatively, data associated with the energy storage unit 310 may be gathered, including, for example, data measured by the sensor(s) 316, data used by the energy storage unit 310 (e.g., parameters for controlling the batteries 318A-318H, or parameters for controlling the cooling system 314, such as a fan speed, a pump utilization rate, or a compressor utilization rate), or any other type of data. The gathered data may be processed by the computing device 312 and/or another computing device (e.g., the user device 116) for one or more aspects described herein.

Disclosed embodiments, including methods, systems, apparatuses, and non-transitory computer-readable media, may relate to optimizing energy dispatch. Energy dispatch may refer to input of energy to energy storage and/or output of energy from energy storage. Disclosed embodiments include a system for optimizing energy dispatch, the system including one or more energy storage units and a computing device including at least one processor and a memory storing instructions that, when executed by the at least one processor, cause the computing device to perform functions as described herein. An energy storage unit may refer to a physical object for storing energy. An energy storage unit may store energy in one or more of various forms, such as electrochemical, chemical, mechanical, electrical, electromagnetic, biological, and/or thermal. In some examples, an energy storage unit may store energy using rechargeable batteries. An example of an energy storage unit is described in connection with FIG. 3. In some embodiments, the one or more energy storage units include one or more battery units. In some embodiments, each battery unit of the one or more battery units includes an enclosure including a plurality of batteries.

Disclosed embodiments include receiving, from a computing device associated with a wholesale energy market, forecasted energy market data. For example, a first computing device (e.g., the user device 116, computing device(s) in the energy storage units 112A, 112B, 112C, or any other computing device) may receive, from a computing device associated with a wholesale energy market, forecasted energy market data. A wholesale energy market may include selling of energy from an entity to a reseller (e.g., an energy storage operator that stores received energy for later output, an electric utility company that distributes electricity to the end-use consumers, and/or the like). The computing device associated with the wholesale energy market may ingest information about and from the wholesale energy market and may, based on a model (e.g., based on machine learning), forecast energy market data. For example, the forecasted energy market data may be generated based on historical energy market data. In some examples, the forecasted energy market data may indicate a predicted energy price for each of a plurality time intervals of a time period (e.g., a predicted energy price for each minute of a 24-hour period). In some examples, the computing device associated with the wholesale energy market may include the energy market device 118. The computing device associated with the wholesale energy market may send the forecasted energy market data to the first computing device.

Figure 4:
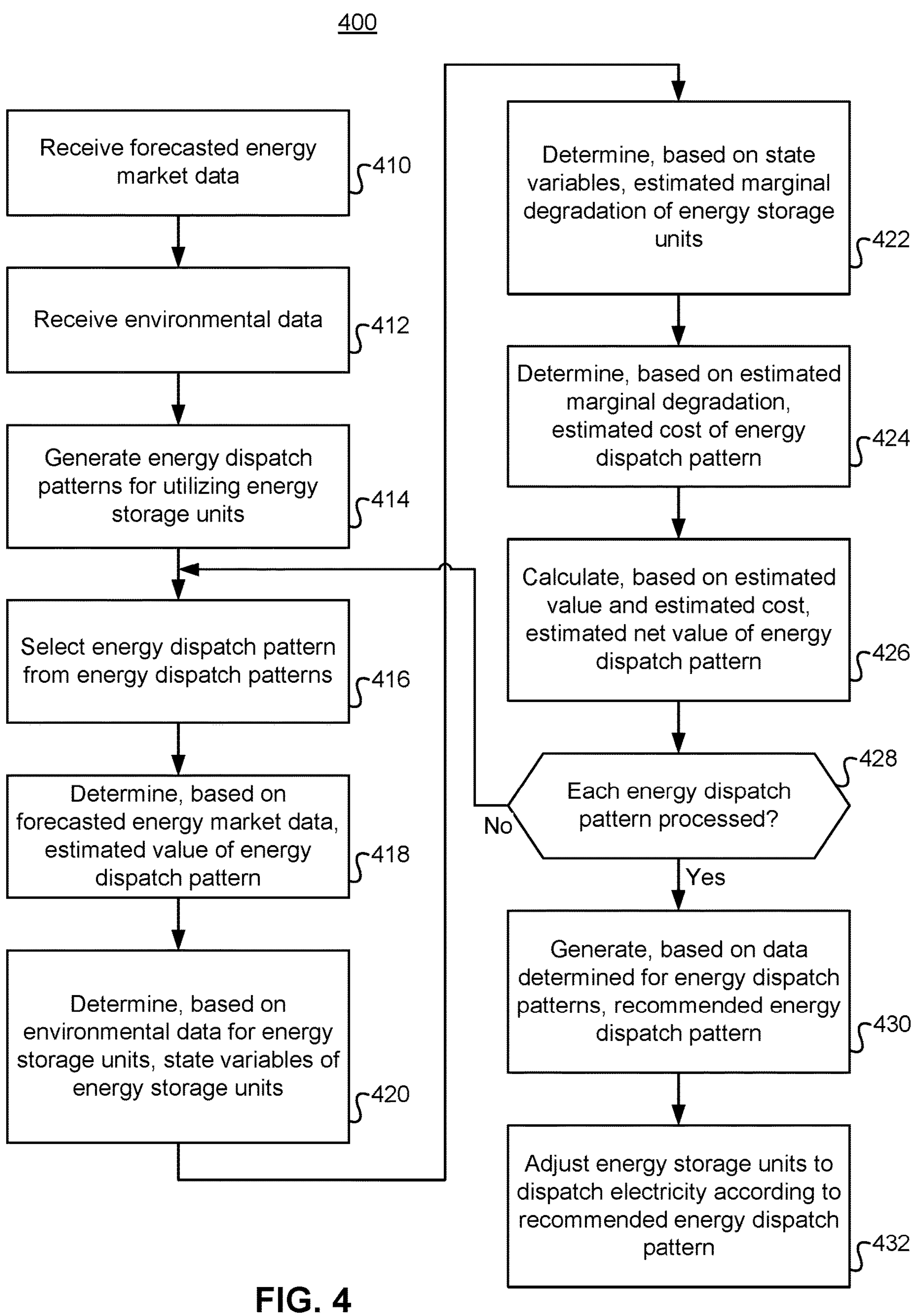
FIG. 4 shows a flowchart of an example method for optimizing energy dispatch, consistent with some embodiments of the present disclosure.

FIG. 4 shows a flowchart of an example method 400 for optimizing energy dispatch, consistent with some embodiments of the present disclosure. With reference to FIG. 4, in step 410, a first computing device may receive forecasted energy market data.

Disclosed embodiments include receiving, from a computing device associated with weather forecasting, environmental data for the one or more energy storage units. For example, the first computing device may receive, from a computing device associated with weather forecasting, environmental data for the one or more energy storage units. In some embodiments, the environmental data for the one or more energy storage units includes one or more of: a forecasted ambient temperature for an area in which the one or more energy storage units are located; or a forecasted ambient humidity for an area in which the one or more energy storage units are located. The environmental data may include any other type of data that may reflect the environment of an area in which the one or more energy storage units are located (e.g., a wind speed in the area, a degree of insolation in the area, and/or the like). Insolation may refer to a measure of the solar energy incident on a specified area over a set period of time. The environmental data may include forecasted data that may be generated based on historical data. In some examples, the environmental data may indicate an environmental parameter for each of a plurality of time intervals of a time period (e.g., a predicted temperature or humidity for each minute of a 24-hour period). In some examples, the computing device associated with weather forecasting may include the weather data device 120. The computing device associated with weather forecasting may send the environmental data to the first computing device. With reference to FIG. 4, in step 412, the first computing device may receive environmental data.

Disclosed embodiments include generating a plurality of energy dispatch patterns for utilizing the one or more energy storage units. For example, the first computing device may generate a plurality of energy dispatch patterns for utilizing the one or more energy storage units. In some embodiments, an energy dispatch pattern of the plurality of energy dispatch patterns includes a plurality of intervals of a time period during which the one or more energy storage units are configured to charge or discharge at a particular rate. For example, an energy dispatch pattern may indicate a rate at which the one or more energy storage units are configured to charge or discharge for each of a plurality of intervals of a time period (e.g., charging at 5 megawatt for the first minute of a 24-hour period, charging at 5 megawatt for the second minute of the 24-hour period, charging at 10 megawatt for the third minute of the 24-hour period, discharging at 20 megawatt for the fourth minute of the 24-hour period, etc.). Each of the plurality of energy dispatch patterns may be for a time period of any desired length (e.g., 24 hours, 48 hours, 72 hours, etc.). In some examples, each of the plurality of energy dispatch patterns may be generated for the same particular time period (e.g., the 24 hours of the next day in the future).

The plurality of energy dispatch patterns may be different from each other. For example, the plurality of energy dispatch patterns may have different numbers of charge-discharge cycles (e.g., cycles of charging and then discharging, or cycles of discharging and then charging). A cycle of charging and then discharging may refer to a time period during which energy storage is charging, followed by a time period during which the energy storage is discharging. In some examples, in between the two time periods, there may be a time period of the energy storage being idle. A cycle of discharging and then charging may refer to a time period during which energy storage is discharging, followed by a time period during which the energy storage is charging. In some examples, in between the two time periods, there may be a time period of the energy storage being idle. Additionally or alternatively, the plurality of energy dispatch patterns may have different rates of charging or discharging, and/or may have different time segments during which to charge or discharge. The plurality of energy dispatch patterns may differ from each other in any other desired manner.

Disclosed embodiments include generating the plurality of energy dispatch patterns by performing an optimization technique based on an objective function and a plurality of different constraints. In some embodiments, the optimization technique includes linear programming or mixed integer linear programming. The optimization technique may include any other desired method for optimization. In some embodiments, the plurality of different constraints include different quantities of charge-discharge cycles to be included in an energy dispatch pattern. For example, the optimization technique may be performed to generate a first energy dispatch pattern when a constraint for the optimization technique requires that one (1) charge-discharge cycle is to be included in the first energy dispatch pattern, and the optimization technique may be performed to generate a second energy dispatch pattern when a constraint for the optimization technique requires that two (2) charge-discharge cycles are to be included in the second energy dispatch pattern. It is contemplated that one or more of these or additional energy dispatch patterns may be generated using constraints requiring any number of charge-discharge cycles.

In some embodiments, the optimization technique determines a particular energy dispatch pattern by maximizing an estimated value of the particular energy dispatch pattern based on market price forecasts for a time period. For example, input data to the optimization technique may include the forecasted energy market data indicating a predicted energy price for each of a plurality time intervals of a time period (e.g., a predicted energy price for each minute of a 24-hour period). In some examples, based on the forecasted energy market data, the optimization technique may generate a particular energy dispatch pattern such that the objective function of the optimization technique may be maximized (e.g., under a particular constraint). The objective function may be, for example, the estimated value of the particular energy dispatch pattern (e.g., the income received by discharging energy by the one or more energy storage units (or selling energy) subtracted by the expense of charging the one or more energy storage units (or purchasing energy), based on the forecasted energy market data). With reference to FIG. 4, in step 414, the first computing device may generate a plurality of energy dispatch patterns for utilizing the one or more energy storage units.

Disclosed embodiments include, for each energy dispatch pattern of the plurality of energy dispatch patterns, performing one or more functions. For example, the first computing device may perform one or more functions for each energy dispatch pattern of the plurality of energy dispatch patterns. The one or more functions are described in greater detail below. With reference to FIG. 4, in step 416, the first computing device may select an energy dispatch pattern from the plurality of energy dispatch patterns for processing (e.g., including performing the one or more functions (e.g., steps 418, 420, 422, 424, and/or 426) for the selected energy dispatch pattern). In step 428, after performing the one or more functions for the selected energy dispatch pattern, the first computing device may determine whether each of the plurality of energy dispatch patterns has been processed. When the first computing device determines that each of the plurality of energy dispatch patterns has been processed (step 428: Yes), the method may proceed to step 430. When the first computing device determines, however, that each of the plurality of energy dispatch patterns has not been processed (step 428: No), the method may return to step 416. In step 416, the first computing device may select another energy dispatch pattern from the plurality of energy dispatch patterns for processing.

In some embodiments, the one or more functions performed for each energy dispatch pattern of the plurality of energy dispatch patterns include determining, based on the forecasted energy market data, an estimated value of the energy dispatch pattern. For example, the first computing device may determine, based on the forecasted energy market data, an estimated value of a particular energy dispatch pattern of the plurality of energy dispatch patterns. The forecasted energy market data may indicate a predicted energy price for each of a plurality time intervals of a time period (e.g., a predicted energy price for each minute of a 24-hour period). The particular energy dispatch pattern may indicate a rate at which the one or more energy storage units are configured to charge or discharge for each of a plurality of intervals of a time period (e.g., charging at 5 megawatt for the first minute of a 24-hour period, charging at 5 megawatt for the second minute of the 24-hour period, charging at 10 megawatt for the third minute of the 24-hour period, discharging at 20 megawatt for the fourth minute of the 24-hour period, etc.). The estimated value of the particular energy dispatch pattern may correspond to, for example, an aggregation of the income received (by discharging or selling energy) or expense (of charging or purchasing energy) for each of the plurality of intervals of the time period of the particular energy dispatch pattern. With reference to FIG. 4, in step 418, the first computing device may determine, based on the forecasted energy market data, an estimated value of the energy dispatch pattern as selected in step 416.

In some embodiments, the one or more functions performed for each energy dispatch pattern of the plurality of energy dispatch patterns include determining, based on the environmental data for the one or more energy storage units, one or more state variables of the one or more energy storage units. For example, the first computing device may determine, based on the environmental data for the one or more energy storage units, one or more state variables of the one or more energy storage units. In some embodiments, the one or more state variables of the one or more energy storage units include temperatures of the one or more energy storage units within one or more enclosures for the one or more energy storage units. In some examples, the temperatures may include temperatures of the batteries of the one or more energy storage units. In some examples, the temperatures may be represented individually for each battery in the one or more energy storage units. In some examples, the temperatures may be represented in aggregation for the batteries of the one or more energy storage units (e.g., an average temperature for the batteries, a maximum temperature for the batteries, a median temperature for the batteries, or any other statistic or metric). In some examples, the temperatures may be a time series of data points indicating temperature(s) for each of a plurality of intervals of a time period. Additionally or alternatively, the one or more state variables of the one or more energy storage units may include any other parameter that may affect or indicate the degradation of the one or more energy storage units (e.g., the auxiliary load, such as the total and maximum power consumption, for supporting the one or more energy storage units).

The determining of the one or more state variables may be based on any suitable method. The environmental data for the one or more energy storage units may be input data for the method. For example, thermodynamic modeling for the one or more energy storage units may be used to predict the one or more state variables based on the environmental data. In some examples, a machine learning model (e.g., a random forest mode or a neural network) may be used to predict the one or more state variables based on the environmental data, as described in greater detail herein (e.g., in connection with anomaly detection in energy storage systems). Disclosed embodiments include determining the one or more state variables of the one or more energy storage units based on the energy dispatch pattern. For example, the particular energy dispatch pattern may be additionally or alternatively input to the model for predicting the one or more state variables. The first computing device may calculate heat generated by the batteries of the one or more energy storage units, based on the electrical resistance of the batteries and the amount of current that the batteries may output. The amount of current may be determined based on a particular energy dispatch pattern. The heat remaining in the batteries of the one or more energy storage units may correspond to the amount of the generated heat subtracted by the amount of heat dissipated via air or other cooling mechanism (e.g., calculated using thermodynamic modeling). The temperatures of the batteries may be calculated based on the amount of the remaining heat.

With reference to FIG. 4, in step 420, the first computing device may determine, based on the environmental data for the one or more energy storage units, one or more state variables of the one or more energy storage units.

In some embodiments, the one or more functions performed for each energy dispatch pattern of the plurality of energy dispatch patterns include determining, based on the one or more state variables, an estimated marginal degradation of the one or more energy storage units. For example, the first computing device may determine, based on the one or more state variables, an estimated marginal degradation of the one or more energy storage units. The estimated marginal degradation may indicate, for example, an amount of reduced capacity of the one or more energy storage units to store energy. For example, if the capacity of the one or more energy storage units is reduced from 50 megawatt hour (MWh) to 49.99 MWh, the marginal degradation may be 0.01 MWh (e.g., 50 MWh subtracted by 49.99 MWh). Disclosed embodiments include determining the estimated marginal degradation of the one or more energy storage units based on the energy dispatch pattern. Disclosed embodiments include determining the estimated marginal degradation by performing a search in a database that maps parameters of an energy dispatch pattern and temperatures of batteries to expected degrees of degradation. The parameters of the energy dispatch pattern may include, for example, the energy throughput of the energy dispatch pattern, a quantity of charge-discharge cycles included in the energy dispatch pattern, the depth of the charge-discharge cycles (e.g., discharging to 80% of capacity and then recharging, discharging to 60% of capacity and then recharging, discharging to 40% of capacity and then recharging, discharging to 20% of capacity and then recharging, discharging to 0% of capacity and then recharging, etc.), distribution of charging or discharging activities over the time span of the energy dispatch pattern (e.g., the time length between two charge-discharge cycles of the energy dispatch pattern, the time length between a charging activity and a discharging activity of the energy dispatch pattern, etc.), and/or any other metric or parameter. As an example, a formula may be used that related temperatures and energy throughput (which may be calculated based on the energy dispatch pattern) may be mapped to a degree of degradation. In some examples, the mapping may be informed by suppliers of batteries for the one or more energy storage units. Additionally or alternatively, other methods (e.g., a machine learning model) may be used to calculate the marginal degradation. With reference to FIG. 4, in step 422, the first computing device may determine, based on the one or more state variables, an estimated marginal degradation of the one or more energy storage units.

In some embodiments, the one or more functions performed for each energy dispatch pattern of the plurality of energy dispatch patterns include determining, based on the estimated marginal degradation, an estimated cost of the energy dispatch pattern. For example, the first computing device may determine, based on the estimated marginal degradation, an estimated cost of the energy dispatch pattern. Disclosed embodiments include determining the estimated cost by calculating a replacement cost for replacing the estimated marginal degradation. The replacement cost may correspond to, for example, a price for obtaining an amount of energy storage capacity (e.g., $100,000 per MWh) multiplied by the amount of the estimated marginal degradation (e.g., 0.01 MWh). Disclosed embodiments include determining the estimated cost by calculating an opportunity cost associated with the estimated marginal degradation. The opportunity cost may be, for example, calculated as the discounted future revenue that is foregone due to the estimated marginal degradation being greater than a planned degradation, or conversely, the future revenue reclaimed if the estimated marginal degradation is less than the planned degradation. A planned degradation may be configured or determined by an operator of the one or more energy storage units (e.g., the operator may plan to use the one or more energy storage units in such a manner that they may degrade to 50% of their original capacity in 30 years). Any other suitable cost model may be used to determine the estimated cost of the energy dispatch pattern. With reference to FIG. 4, in step 424, the first computing device may determine, based on the estimated marginal degradation, an estimated cost of the energy dispatch pattern as selected in step 416.

In some embodiments, the one or more functions performed for each energy dispatch pattern of the plurality of energy dispatch patterns include calculating, based on the estimated value and the estimated cost, an estimated net value of the energy dispatch pattern. For example, the first computing device may calculate, based on the estimated value of the energy dispatch pattern and the estimated cost of the energy dispatch pattern, an estimated net value of the energy dispatch pattern. The estimated net value may refer to, for example, a predicted net profit of the energy dispatch pattern (e.g., a monetary value). The estimated net value may correspond to, for example, the estimated value of the energy dispatch pattern subtracted by the estimated cost of the energy dispatch pattern. With reference to FIG. 4, in step 426, the first computing device may calculate, based on the estimated value of the energy dispatch pattern as selected in step 416 and the estimated cost of the energy dispatch pattern, an estimated net value of the energy dispatch pattern.

Disclosed embodiments include generating, based on data determined for each energy dispatch pattern of the plurality of energy dispatch patterns, a recommended energy dispatch pattern. For example, the first computing device may generate, based on data determined for each energy dispatch pattern of the plurality of energy dispatch patterns, a recommended energy dispatch pattern. The data determined for each energy dispatch pattern of the plurality of energy dispatch patterns may include, for example, the estimated net values for the plurality of energy dispatch patterns. Additionally or alternatively, the data determined for each energy dispatch pattern of the plurality of energy dispatch patterns may include estimated profits of the plurality of energy dispatch patterns, estimated values or revenues of the plurality of energy dispatch patterns, estimated costs of the plurality of energy dispatch patterns, estimated marginal degradations of the plurality of energy dispatch patterns, or any other type of data suitable for generating the recommended energy dispatch pattern. Disclosed embodiments include generating, based on estimated net values for the plurality of energy dispatch patterns, a recommended energy dispatch pattern. For example, the first computing device may generate, based on estimated net values for the plurality of energy dispatch patterns, a recommended energy dispatch pattern. Disclosed embodiments include generating the recommended energy dispatch pattern by selecting, from the plurality of energy dispatch patterns, an energy dispatch pattern whose estimated net value is larger than the estimated net values of other energy dispatch patterns of the plurality of energy dispatch patterns and is larger than a configured threshold. The configured threshold may be determined, for example, by an operator of the one or more energy storage units, so that if any energy dispatch pattern results in a net loss or results in a net profit that is less than the threshold amount (e.g., $0, $500, $1,000, $2,000, or any other desired amount), the energy dispatch pattern may not be recommended to the operator. Additionally or alternatively, the generating of the recommended energy dispatch pattern may be based on considering other factors, such as the number of charge-discharge cycles included in the energy dispatch pattern, the depth of the charge-discharge cycles, and/or any other factor. Various weights may be assigned to the factors, and a weighted score indicating a degree of proximity to preferred settings for the factors may be calculated for each of the plurality of energy dispatch patterns. The recommended energy dispatch pattern may correspond to an energy dispatch pattern, of the plurality of energy dispatch patterns, with a highest weighted score. With reference to FIG. 4, in step 430, the first computing device may generate, based on data determined for each energy dispatch pattern of the plurality of energy dispatch patterns (e.g., estimated net values for the plurality of energy dispatch patterns), a recommended energy dispatch pattern.

Disclosed embodiments include adjusting the one or more energy storage units to dispatch electricity according to the recommended energy dispatch pattern. For example, the first computing device may adjust the one or more energy storage units to dispatch electricity according to the recommended energy dispatch pattern. The first computing device may, for example, instruct control components for the one or more energy storage units to cause the one or more energy storage units (e.g., the batteries therein) to charge or discharge during a particular time and at a particular rate (or to be idle during a particular time) as indicated in the recommended energy dispatch pattern. The charge and discharge of the one or more energy storage units may be controlled using appropriate techniques, such as circuits with switch controls, charge or discharge controllers, charge or discharge regulators, battery regulators, and/or the like, so that the one or more energy storage units may be controlled to be in a state of receiving electricity from a source at a particular rate, in a state of outputting electricity to a load at a particular rate, or in a state of being idle. With reference to FIG. 4, in step 432, the first computing device may adjust the one or more energy storage units to dispatch electricity according to the recommended energy dispatch pattern.

Figure 5:
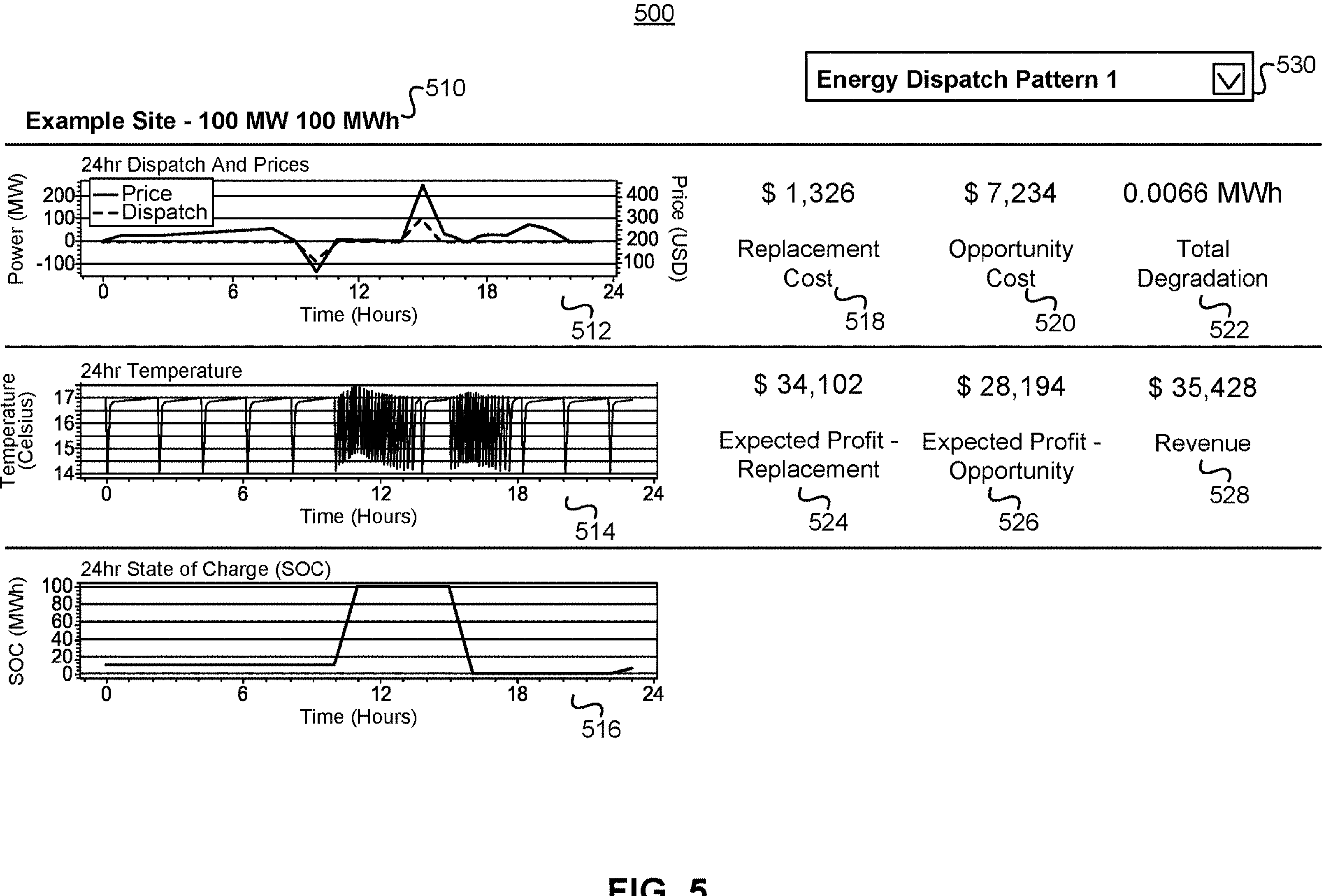
FIG. 5 shows an example user interface associated with optimizing energy dispatch, consistent with some embodiments of the present disclosure.

Disclosed embodiments include causing display of a user interface illustrating the recommended energy dispatch pattern. For example, the first computing device may cause display of a user interface illustrating the recommended energy dispatch pattern. The user interface may illustrate, for example, the charging, discharging, or being idle of the one or more energy storage units in a time series of data points. FIG. 5 shows an example user interface 500 associated with optimizing energy dispatch, consistent with some embodiments of the present disclosure. The user interface may illustrate for an energy storage system identified by an identifier 510 (e.g., "Example Site—100 MW 100 MWh"). A diagram 512 shows data points of forecasted energy price and an energy dispatch pattern (e.g., recommended based on the forecasted energy price) over a 24-hour period. The diagram 512 shows the energy dispatch pattern indicates charging during a particular time (e.g., the 10th hour) and discharging at a particular time (e.g., the 15th hour). A diagram 514 shows temperature associated with the one or more energy storage units over a 24-hour period. A diagram 516 shows the state of charge (SOC) of the one or more energy storage units over a 24-hour period. An identifier 518 shows a replacement cost for the energy dispatch pattern. An identifier 520 shows an opportunity cost for the energy dispatch pattern. An identifier 522 shows a total degradation of the one or more energy storage units for the energy dispatch pattern. An identifier 524 shows an expected profit of the energy dispatch pattern (e.g., an estimated net value of the energy dispatch pattern) considering the replacement cost. An identifier 526 shows an expected profit of the energy dispatch pattern (e.g., an estimated net value of the energy dispatch pattern) considering the opportunity cost. An identifier 528 shows a revenue of the energy dispatch pattern (e.g., an estimated value of the energy dispatch pattern). A pulldown menu 530 may allow a user to select an energy dispatch pattern to be shown on the user interface (e.g., "Energy Dispatch Pattern 1" is shown on the user interface, and other energy dispatch patterns may be selected to be shown on the user interface). Using a button, a pulldown menu, or some other trigger, a user may compare two or more energy dispatch patterns by selecting the energy dispatch patterns from a pulldown menu. The user interface shown in FIG. 5 is exemplary and other types of displays are contemplated. The user interface may bring together various relevant items of information on one screen, allowing a user to quickly determine the best energy dispatch pattern.

In some embodiments, a method for optimizing energy dispatch includes: generating, by a computing device, a plurality of energy dispatch patterns for utilizing one or more energy storage units; generating, based on data determined for each energy dispatch pattern of the plurality of energy dispatch patterns, a recommended energy dispatch pattern; and adjusting the one or more energy storage units to dispatch electricity according to the recommended energy dispatch pattern. In some embodiments, the method includes, for each energy dispatch pattern of the plurality of energy dispatch patterns: determining, based on forecasted energy market data, an estimated value of the energy dispatch pattern; determining, based on environmental data for the one or more energy storage units, one or more state variables of the one or more energy storage units; determining, based on the one or more state variables, an estimated marginal degradation of the one or more energy storage units; determining, based on the estimated marginal degradation, an estimated cost of the energy dispatch pattern; and calculating, based on the estimated value and the estimated cost, an estimated net value of the energy dispatch pattern. In some embodiments, the method also includes generating, based on estimated net values for the plurality of energy dispatch patterns, the recommended energy dispatch pattern.

In some embodiments, a non-transitory computer-readable medium stores instructions for optimizing energy dispatch. The instructions, when executed by at least one processor, cause the at least one processor to: generate a plurality of energy dispatch patterns for utilizing one or more energy storage units; generate, based on data determined for each energy dispatch pattern of the plurality of energy dispatch patterns, a recommended energy dispatch pattern; and adjust the one or more energy storage units to dispatch electricity according to the recommended energy dispatch pattern. In some embodiments, the instructions, when executed by at least one processor, cause the at least one processor to, for each energy dispatch pattern of the plurality of energy dispatch patterns: determine, based on forecasted energy market data, an estimated value of the energy dispatch pattern; determine, based on environmental data for the one or more energy storage units, one or more state variables of the one or more energy storage units; determine, based on the one or more state variables, an estimated marginal degradation of the one or more energy storage units; determine, based on the estimated marginal degradation, an estimated cost of the energy dispatch pattern; and calculate, based on the estimated value and the estimated cost, an estimated net value of the energy dispatch pattern. In some embodiments, the instructions, when executed by at least one processor, cause the at least one processor to generate, based on estimated net values for the plurality of energy dispatch patterns, the recommended energy dispatch pattern.

Disclosed embodiments, including methods, systems, apparatuses, and non-transitory computer-readable media, may relate to anomaly detection in energy storage systems. An anomaly in energy storage systems may include any operation, function, or implementation outside of an expected range for energy storage systems. In some embodiments, a system for anomaly detection in energy storage systems includes one or more energy storage units and a computing device including at least one processor and a memory storing instructions that, when executed by the at least one processor, cause the computing device to perform functions as described herein. An energy storage unit may refer to a physical object for storing energy. An energy storage unit may store energy in one or more of various forms, such as electrochemical, chemical, mechanical, electrical, electromagnetic, biological, and/or thermal. In some examples, an energy storage unit may store energy using rechargeable batteries. An example of an energy storage unit is described in connection with FIG. 3. In some embodiments, each energy storage unit of the one or more energy storage units includes an enclosure including a plurality of batteries. The enclosure may be in any desired shape, and/or may be constructed using any desired material. For example, the enclosure may have a shape of a rectangular cuboid or a cube. In some embodiments, the computing device is associated with a cloud architecture. For example, the computing device may be implemented using virtualization technologies and/or cloud computing technologies. For example, components of the computing device (e.g., a processor, a memory, a network interface, an input device, and/or an output device) may be implemented virtually (e.g., to work as a virtual machine on top of a physical computing device). In some embodiments, the computing device is local to the one or more energy storage units. For example, the computing device may be located within the enclosures of the one or more energy storage units or in an area of a site of the one or more energy storage units. In some examples, the computing device may be remote from the one or more energy storage units. For example, the computing device may be located in a datacenter connected via a network to the one or more energy storage units.

Figure 6:
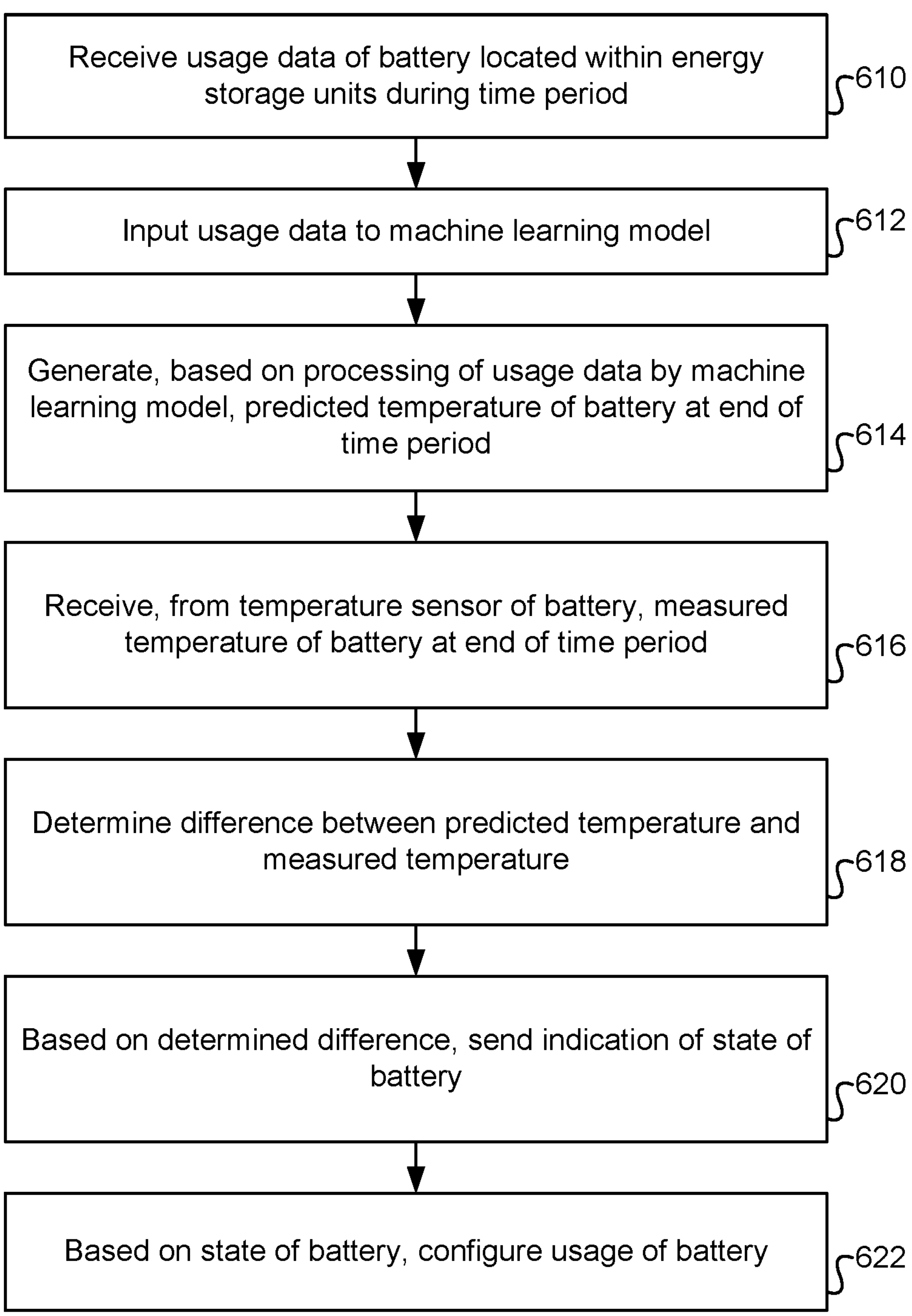
FIG. 6 shows a flowchart of an example method for anomaly detection in energy storage systems, consistent with some embodiments of the present disclosure.

Disclosed embodiments include receiving usage data of a battery located within the one or more energy storage units during a time period. For example, a computing device (e.g., the user device 116, computing device(s) in the energy storage units 112A, 112B, 112C, or any other computing device) may receive usage data of a battery located within the one or more energy storage units during a time period. The time period may have any desired length (e.g., 1 minute, 2 minutes, 5 minutes, 10 minutes, 30 minutes, 1 hour, 2 hours, 5 hours, 10 hours, 24 hours, 48 hours, etc.). In some embodiments, the usage data of the battery includes one or more of: a starting state of charge of the battery for the time period; an ending state of charge of the battery for the time period; a sum of current squared of the battery for the time period; a voltage pattern of the battery associated with the time period; a dispatch pattern associated with the battery for the time period; a measured temperature of the battery at the start of the time period; an ambient temperature or humidity associated with the battery during the time period; one or more utilization parameters of a cooling system for the battery during the time period; or a relative location of the battery within an enclosure of an energy storage unit including the battery. A state of charge may refer to a level of charge of a battery relative to its capacity. The starting state of charge for the time period may be a state of charge of the battery at the beginning of the time period. The ending state of charge for the time period may be a state of charge of the battery at the end of the time period. The sum of current squared of the battery for the time period may correspond to, for example, an integration or accumulation of the current of the battery as squared over the span of the time period and may be representative of an amount of energy being supplied to the battery or from the battery. The voltage pattern of the battery may include, for example, a time series of data points of the voltage of the battery over the time period. The dispatch pattern associated with the battery for the time period may include, for example, an energy dispatch pattern for the battery for the time period as described herein. The ambient temperature or humidity associated with the battery during the time period may include, for example, the temperature or humidity in an area where the battery is located during the time period. The one or more utilization parameters of a cooling system for the battery during the time period may include, for example, an extent to which the cooling system may be used during the time period (e.g., a fan speed, a pump utilization rate, or a compressor utilization rate, etc.). The relative location of the battery within an enclosure of an energy storage unit including the battery may be, for example, measured using three-dimensional coordinates, using the battery's location as in relation to other batteries of the energy storage unit, or any other suitable method. In some examples, the usage data may be received from sensors or other systems associated with the battery. FIG. 6 shows a flowchart of an example method 600 for anomaly detection in energy storage systems, consistent with some embodiments of the present disclosure. With reference to FIG. 6, in step 610, a computing device may receive usage data of a battery located within one or more energy storage units during a time period.

Disclosed embodiments include inputting the usage data to a machine learning model. For example, the computing device may input the usage data to a machine learning model. The inputting of the usage data to the machine learning model may include, for example, retrieving the usage data as stored in a memory of the computing device (e.g., as stored in a database), and configuring the machine learning model to process the retrieved usage data. Additionally or alternatively, the computing device may configure the machine learning model to read the usage data as stored by the computing device, and to process the usage data. In some embodiments, the machine learning model includes one of a random forest model or a neural network. Additionally or alternatively, any other suitable machine learning model may be used. In some examples, other types of models or methods may be used for predicting a temperature of the battery, such as lookup tables or mappings, formulas that may model the heat transfer processes for the battery, or other suitable algorithms. Disclosed embodiments include receiving particular usage data of the battery during periods of time when the battery is manually deemed to exhibit normal behavior; receiving measured temperature data of the battery at the end of each of the periods of time; and training the machine learning model using the particular usage data and the measured temperature data. For example, an individual who may operate the battery may indicate a time period when the battery is deemed to exhibit normal behavior, and may cause usage data of the battery to be gathered during the time period. Temperature of the battery may be measured by a sensor at the end of the time period. The training of the machine learning model may use any suitable training algorithm. A data set for training the machine learning model may be based on, for example, historical usage data of the battery for one or more time periods when the battery is deemed to exhibit normal behavior, and the corresponding temperature of the battery measured at the end of each of the one or more time periods. Validation and testing of the trained machine learning model may be performed, for example, using a validation data set or a testing data set. The validation data set or testing data set may be established in a similar manner as the data set for training and may use data for time period(s) different from the time period(s) included in the training data set. With reference to FIG. 6, in step 612, the computing device may input the usage data to a machine learning model.

Disclosed embodiments include generating, based on processing of the usage data by the machine learning model, a predicted temperature of the battery at the end of the time period. For example, the computing device may generate, based on processing of the usage data by the machine learning model, a predicted temperature of the battery at the end of the time period. For example, the machine learning model may include a number of input nodes, one or more intermediate nodes, and an output node (the relationships or interconnectivities among the nodes may be configured during the training of the machine learning model). Each of the input nodes may correspond to a particular item in the usage data. The value of each input node may be set to the value of the corresponding item in the usage data for the time period. Based on the relationships or interconnectivities among the nodes of the machine learning model, the input values to the input nodes may trigger other nodes of the machine learning model, and may cause the output node to generate a value corresponding to the predicted temperature of the battery at the end of the time period. With reference to FIG. 6, in step 614, the computing device may generate, based on processing of the usage data by the machine learning model, a predicted temperature of the battery at the end of the time period.

Disclosed embodiments include receiving, from a temperature sensor of the battery, a measured temperature of the battery at the end of the time period. For example, the computing device may receive, from a temperature sensor of the battery, a measured temperature of the battery at the end of the time period. The temperature sensor may include, for example, a thermometer, a bimetallic strip, a thermistor, a thermocouple, a resistance thermometer, a silicon bandgap temperature sensor, or any other type of temperature sensor. The temperature sensor may be located in the battery, on the surface of the battery, or at any other suitable location. In some examples, the temperature sensor may measure temperature using, for example, infrared radiation, and may be located separate from the battery to measure the temperature of the battery. The temperature sensor of the battery may be instructed to measure the temperature of the battery at the end of the time period, and may be configured to send the measured temperature to the computing device. For example, data indicating the measured temperature may be transmitted to the computing device via a wired or wireless connection between the temperature sensor and the computing device. With reference to FIG. 6, in step 616, the computing device may receive, from a temperature sensor of the battery, a measured temperature of the battery at the end of the time period.

Disclosed embodiments include determining a difference between the predicted temperature and the measured temperature. For example, the computing device may determine a difference between the predicted temperature and the measured temperature. The difference may include, for example, a subtraction or a ratio between the predicted temperature and the measured temperature. For example, a ratio closer to one (1) may indicate a smaller difference, and a ratio further from one (1) may indicate a larger difference. Additionally or alternatively, the difference may include a signed value or an absolute value. An anomaly of the battery may be detected, for example, based on determining that the difference satisfies a threshold (e.g., configured by an operator of the battery). In some examples, an anomaly of the battery may be detected based on comparing the measured temperature and the predicted temperature, and determining that the measured temperature is greater than or less than the predicted temperature. In some examples, the calculations may be repeated for multiple time periods, and average values or maximum values for the multiple time periods may be differenced or compared for determining whether an anomaly of the battery is detected. With reference to FIG. 6, in step 618, the computing device may determine a difference between the predicted temperature and the measured temperature.

Disclosed embodiments include, based on the determined difference between the predicted temperature and the measured temperature, sending an indication of a state of the battery. For example, the computing device may, based on the determined difference between the predicted temperature and the measured temperature, send an indication of a state of the battery. The indication may be in any desired form (e.g., an email notification, a pop-up window, a text message, a graphical display, a pie chart, a bar chart, an icon, etc.). The indication may be sent to any suitable device (e.g., a device associated with an operator of the battery). The state of the battery may include, for example, a normal state, a state of an anomaly, or any other status of the battery. In some examples, the state of the battery may include a degree of normality of the battery. The state of the battery may be determined based on the difference between the predicted temperature and the measured temperature. For example, the computing device may determine that the battery may be in a normal state when the temperature difference is within a particular range (e.g., −1.5 degrees Celsius to 1.5 degrees Celsius, or any other desired range), and may determine that the battery may be in a state of an anomaly when the temperature difference is outside the particular range. Additionally or alternatively, the computing device may determine a degree of normality of the battery, for example, to be inversely proportional to a magnitude of the temperature difference. In some examples, a degree of normality of the battery may be determined to be inversely proportional to a distance between a value of the temperature difference and a reference value (e.g., zero (0) degrees Celsius, or any other desired value). Disclosed embodiments include, based on the difference satisfying a threshold, sending an indication that an anomaly of the battery is detected. For example, the computing device may, based on the difference satisfying a threshold, send an indication that an anomaly of the battery is detected. The computing device may compare the difference with the threshold, and may determine whether the difference satisfies (e.g., meets or exceeds) the threshold. The indication may include, for example, a notification to an individual (e.g., an operator for the battery). The indication may be in any desired form (e.g., an email notification, a pop-up window, a text message, a graphical display, a pie chart, a bar chart, an icon, etc.). The indication may be, for example, presented to an individual (e.g., an operator associated with the battery). The indication may be presented on any suitable device (e.g., a user device, a computing device, etc.). In some examples, the indication may trigger an alarm, blinking lights, or any other type of signaling (e.g., in a control room for the operator associated with the battery). In some examples, the indication may include the difference between the predicted temperature and the measured temperature, the threshold, and/or other information. In some examples, the indication may include a severity of the detected anomaly based on the difference between the predicted temperature and the measured temperature and/or based on how much the difference between the predicted temperature and the measured temperature may exceed the threshold. With reference to FIG. 6, in step 620, the computing device may, based on the determined difference between the predicted temperature and the measured temperature, send an indication of a state of the battery. For example, the computing device may, based on the difference satisfying a threshold, send an indication that an anomaly of the battery is detected.

Disclosed embodiments include, based on the state of the battery, configuring usage of the battery. For example, the computing device may, based on the state of the battery, configure usage of the battery. Configuring the usage of the battery may include, for example, continuing the usage of the battery, or adjusting the usage of the battery. For example, the computing device may continue the existing manner in which the battery may be used (e.g., the computing device may not cause a change to the existing manner) when the state of the battery indicates a normal state of the battery, and may adjust the existing manner in which the battery may be used when the state of the battery indicates a state of an anomaly of the battery. Additionally or alternatively, the configuring of the usage of the battery may be based on a degree of normality of the battery. For example, an extent to which the manner in which the battery may be used may be changed may be configured to be inversely proportional to the degree of normality of the battery (e.g., a smaller extent of the change may be caused when there is a higher degree of normality of the battery, and a larger extent of the change may be caused when there is a lower degree of normality of the battery). Disclosed embodiments include, based on detecting the anomaly of the battery, adjusting usage of the battery. For example, the computing device may, based on detecting the anomaly of the battery, adjust usage of the battery. Disclosed embodiments include adjusting the usage of the battery by one or more of: suspending the usage of the battery, reducing the usage of the battery, or modifying a usage pattern of the battery. The computing device may, for example, instruct control components for the battery to adjust the usage of the battery. For example, the current, rate of current flow, voltage, time length of use, or any other usage parameter of the battery may be adjusted. In some examples, the adjustment of the usage of the battery may be based on the severity of the detected anomaly. For example, the usage of the battery may be reduced by a greater extent if the severity of the detected anomaly is greater. Modifying the usage pattern of the battery may include, for example, modifying the depth of charge-discharge cycles for the battery (e.g., switching between shallower cycles and deeper cycles), modifying the quantity (e.g., one (1), two (2), three (3), four (4), etc.) of charge-discharge cycles during a time period for the battery, and/or modifying any other parameter of the usage pattern of the battery. The depth of a charge-discharge cycle for a battery may refer to, for example, an extent, of the total capacity of the battery, which the battery may discharge to or charge from in the charge-discharge cycle (e.g., discharging to 80% of capacity and then recharging, discharging to 60% of capacity and then recharging, discharging to 40% of capacity and then recharging, discharging to 20% of capacity and then recharging, discharging to 0% of capacity and then recharging, etc.). With reference to FIG. 6, in step 622, the computing device may, based on the state of the battery, configure usage of the battery. For example, the computing device may, based on detecting the anomaly of the battery, adjust usage of the battery.

Disclosed embodiments include, for each particular battery of a plurality of batteries of the one or more energy storage units: generating, using the machine learning model, a predicted temperature of the particular battery at the end of the time period; receiving a measured temperature of the particular battery at the end of the time period; and determining a temperature difference between the predicted temperature of the particular battery and the measured temperature of the particular battery. For example, the computing device may determine a temperature difference between a predicted temperature and a measured temperature for each of a plurality of batteries of the one or more energy storge units. In some examples, the plurality of batteries may have relative locations that may be different from each other. Their relative locations may be input to the machine learning model, so that the machine learning model may consider the relative location of a battery when generating a predicted temperature for the battery. Each of the plurality of batteries may be associated with a sensor (which may have characteristics and/or functions similar to those of the temperature sensor(s) described above) for measuring the temperature of the corresponding battery.

Figure 7:
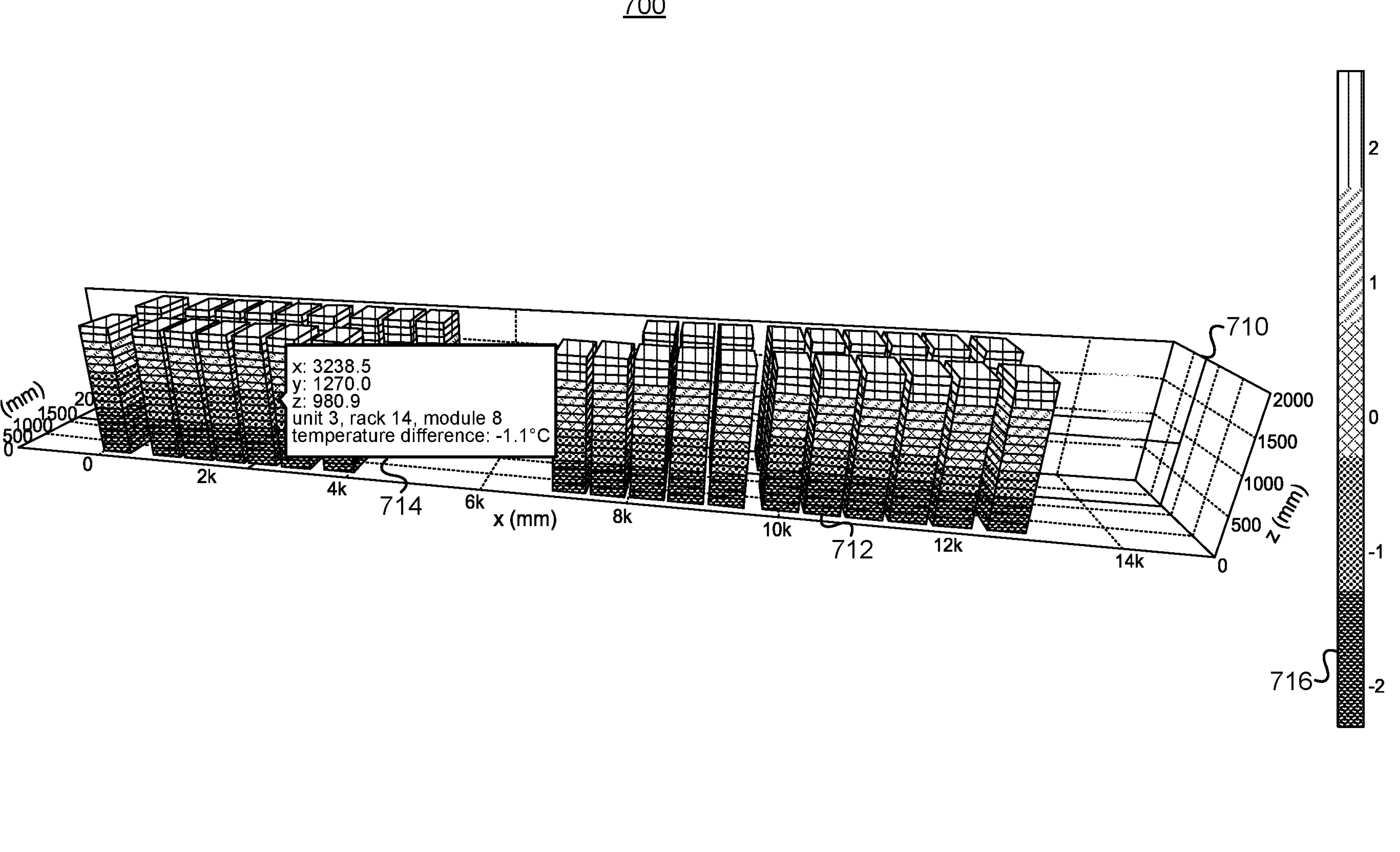
FIG. 7 shows an example user interface associated with anomaly detection in energy storage systems, consistent with some embodiments of the present disclosure.

Disclosed embodiments include causing display of a user interface indicating the plurality of batteries, relative locations of the plurality of batteries, and the temperature difference for each of the plurality of batteries. In some examples, the user interface may list the plurality of batteries and may indicate their respective locations and temperature differences (e.g., in a listing). The user interface may have any desired form (e.g., a pop-up window, a listing of tiles, etc.). A listing of tiles may include, for example, an organization of a display into mutually non-overlapping frames. In some embodiments, the user interface indicates the relative locations of the plurality of batteries in a three-dimensional perspective, and indicates the temperature difference for each of the plurality of batteries using a color scale. The temperature difference for each of the plurality of batteries may be indicated using other desired methods. FIG. 7 shows an example user interface 700 associated with anomaly detection in energy storage systems, consistent with some embodiments of the present disclosure. The user interface shows a three-dimensional view 710. The user interface shows a number of batteries as boxes (e.g., a battery 712). A scale 716 indicating degrees of the temperature difference may use a pattern scale, a color scale, or any other type of suitable indication. Each of the batteries as shown as boxes in the user interface may be displayed to be associated with a corresponding indication of the degree of the temperature difference for the battery (e.g., a pattern, a color, etc.). A window 714 may be invoked, for example, when a cursor (e.g., controlled by a user) clicks on or hovers over a particular battery. Additionally or alternatively, the window 714 may be invoked via a touching screen, by speaking into a microphone and/or voice recognition and processing, by entering text in a text input box, by selecting from a pulldown menu, or by any other desired method. The window 714 may show the location of the battery (e.g., as indicated by the x, y, and z coordinates), may show an identifier of the battery (e.g., energy storage unit 3, rack 14, battery module 8), and may show the temperature difference for the battery (e.g., −1.1° C.). The user interface shown in FIG. 7 is exemplary and other types of displays are contemplated. For example, the user interface may be a tabular listing, a picture of the rack (where the batteries may be placed) color-coded with the temperature differences, a pie chart showing the number of batteries with different temperature differences, or a line plot. In some examples, selecting a particular battery may show a time series plot of temperature data or a tabular listing of temperature data. The user interface may present pertinent information on one screen without requiring the user to go to multiple screens. There may be other buttons, list boxes, pulldown menus, and/or other features to allow the user to zoom in or out on the data via one screen.

Disclosed embodiments include determining, for the battery, a difference between a predicted temperature and a measured temperature for each of a plurality of periods of time; and determining, based on the difference for each of the plurality of periods of time, whether an anomaly of the battery is detected. For example, the predicted temperature may be determined based on the machine learning model, and the measured temperature may be measured using a sensor for the battery. The plurality of periods of time may be any desired time periods, such as consecutive time periods, time periods of equal length, time periods with different lengths, time periods separated apart from each other by an equal length, time periods separated apart from each other by different lengths, a particular time of day for a number of days, and/or time periods with any other desired configuration. In some examples, the computing device may calculate an average of the difference for each of the plurality of periods of time, and may use the average to determine whether an anomaly of the battery is detected (e.g., by comparing the average with a threshold). In some examples, the computing device may determine whether the determined differences for the plurality of periods of time indicate an increasing trend of the extent of the differences, suggesting an anomaly of the battery. Additionally or alternatively, a maximum of the determined differences for the plurality of periods of time, a minimum of the determined differences for the plurality of periods of time, a value calculated based on a computing function or slope as applied to the determined differences for the plurality of periods of time, and/or any other desired metric based on the determined differences for the plurality of periods of time may be used for determining whether an anomaly of the battery is detected (e.g., by comparing the metric with a threshold).

Disclosed embodiments include inputting the usage data to a second machine learning model; generating, based on processing of the usage data by the second machine learning model, a predicted voltage of the battery at the end of the time period; receiving, from a voltage sensor of the battery, a measured voltage of the battery at the end of the time period; determining a voltage difference between the predicted voltage and the measured voltage; and sending the indication that the anomaly of the battery is detected when the voltage difference satisfies a threshold. The second machine learning model may include, for example, a random forest model, a neural network, or any other suitable model.

The second machine learning model may be trained using voltage data of the battery measured during time periods when the battery is manually deemed to exhibit normal behavior. The threshold with which the voltage difference is compared may be set, for example, by an operator associated with the battery to be any desired value (e.g., 1 volt, 2 volts, 5 volts, 10 volts, etc.). In some examples, the computing device may retrieve the usage data as stored in a memory of the computing device, and may configure the second machine learning model to process the usage data. The second machine learning model may include, for example, input node(s), intermediate node(s), and/or output node(s). The values of the input nodes may be set to the values of the corresponding items in the usage data. The input values to the input nodes may trigger other nodes of the second machine learning model, and may cause the output node(s) to generate a value corresponding to the predicted voltage of the battery at the end of the time period. The voltage sensor may measure a voltage of the battery at the end of the time period, and may transmit data indicating the measured voltage to the computing device (e.g., via a connection between the voltage sensor and the computing device). The computing device may receive the data indicating the measured voltage. The computing device may calculate the voltage difference between the measured voltage and the predicted voltage (e.g., by calculating a subtraction between the measured voltage and the predicted voltage, a ratio between the measured voltage and the predicted voltage, or any other desired metric). The computing device may compare the voltage difference with the threshold, and may send the indication that the anomaly of the battery is detected when the voltage difference satisfies (e.g., meets or exceeds) the threshold. The detection of the anomaly of the battery may be based on both the voltage and the temperature of the battery, may be based on the temperature of the battery, may be based on the voltage of the battery, or may be based on other desired parameter(s) of the battery.

In some embodiments, a method for anomaly detection in energy storage systems includes: receiving, by a computing device, usage data of a battery located within one or more energy storage units during a time period; inputting the usage data to a machine learning model; generating, based on processing of the usage data by the machine learning model, a predicted temperature of the battery at the end of the time period; receiving, from a temperature sensor of the battery, a measured temperature of the battery at the end of the time period; determining a difference between the predicted temperature and the measured temperature; based on the determined difference, sending an indication of a state of the battery; and based on the state of the battery, configuring usage of the battery. In some embodiments, the method includes: based on the difference satisfying a threshold, sending an indication that an anomaly of the battery is detected; and based on detecting the anomaly of the battery, adjusting usage of the battery. In some embodiments, each energy storage unit of the one or more energy storage units includes an enclosure including a plurality of batteries. In some embodiments, the method includes, for each particular battery of a plurality of batteries of the one or more energy storage units: generating, using the machine learning model, a predicted temperature of the particular battery at the end of the time period; receiving a measured temperature of the particular battery at the end of the time period; and determining a temperature difference between the predicted temperature of the particular battery and the measured temperature of the particular battery. In some embodiments, the method includes causing display of a user interface indicating the plurality of batteries, relative locations of the plurality of batteries, and the temperature difference for each of the plurality of batteries.

In some embodiments, a non-transitory computer-readable medium stores instructions for anomaly detection in energy storage systems. The instructions, when executed by at least one processor, cause the at least one processor to: receive usage data of a battery located within one or more energy storage units during a time period; input the usage data to a machine learning model; generate, based on processing of the usage data by the machine learning model, a predicted temperature of the battery at the end of the time period; receive, from a temperature sensor of the battery, a measured temperature of the battery at the end of the time period; determine a difference between the predicted temperature and the measured temperature; based on the determined difference, send an indication of a state of the battery; and based on the state of the battery, configure usage of the battery. In some embodiments, the instructions, when executed by the at least one processor, cause the at least one processor to: based on the difference satisfying a threshold, send an indication that an anomaly of the battery is detected; and based on detecting the anomaly of the battery, adjust usage of the battery. In some embodiments, the instructions, when executed by the at least one processor, cause the at least one processor to: for each particular battery of a plurality of batteries of the one or more energy storage units: generate, using the machine learning model, a predicted temperature of the particular battery at the end of the time period; receive a measured temperature of the particular battery at the end of the time period; and determine a temperature difference between the predicted temperature of the particular battery and the measured temperature of the particular battery. In some embodiments, the instructions, when executed by the at least one processor, cause the at least one processor to cause display of a user interface indicating the plurality of batteries, relative locations of the plurality of batteries, and the temperature difference for each of the plurality of batteries.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above-described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above-described modules/units can be combined as one module or unit, and each of the above-described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof. And other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

The invention claimed is:

1. A system comprising:

one or more energy storage units; and a computing device comprising at least one processor and a memory storing instructions that, when executed by the at least one processor, cause the computing device to:

generate a plurality of energy dispatch patterns for utilizing the one or more energy storage units;

determine, for each energy dispatch pattern of the plurality of energy dispatch patterns, an estimated net value by:

determining, based on forecasted energy market data, an estimated value of the energy dispatch pattern;

determining, based on environmental data for the one or more energy storage units, one or more state variables of the one or more energy storage units;

determining, based on the one or more state variables, an estimated marginal degradation of the one or more energy storage units;

determining, based on the estimated marginal degradation, an estimated cost of the energy dispatch pattern; and calculating, based on the estimated value and the estimated cost, the estimated net value of the energy dispatch pattern;

generate, based on the estimated net value determined for each energy dispatch pattern of the plurality of energy dispatch patterns, a recommended energy dispatch pattern; and adjust the one or more energy storage units to dispatch electricity according to the recommended energy dispatch pattern.

2. The system of claim 1, wherein the one or more energy storage units include one or more battery units, and wherein each battery unit of the one or more battery units comprises an enclosure including a plurality of batteries.

3. The system of claim 1, wherein the instructions, when executed by the at least one processor, cause the computing device to:

cause display of a user interface illustrating the recommended energy dispatch pattern.

4. The system of claim 1, wherein the instructions, when executed by the at least one processor, cause the computing device to:

generate the plurality of energy dispatch patterns by performing an optimization technique based on an objective function and a plurality of different constraints.

5. The system of claim 4, wherein the optimization technique comprises linear programming or mixed integer linear programming.

6. The system of claim 4, wherein the plurality of different constraints comprise different quantities of charge-discharge cycles to be included in an energy dispatch pattern.

7. The system of claim 4, wherein the optimization technique determines a particular energy dispatch pattern by maximizing an estimated value of the particular energy dispatch pattern based on market price forecasts for a time period.

8. The system of claim 1, wherein an energy dispatch pattern of the plurality of energy dispatch patterns includes a plurality of intervals of a time period during which the one or more energy storage units are configured to charge or discharge at a particular rate.

9. The system of claim 1, wherein the instructions, when executed by the at least one processor, cause the computing device to:

generate the recommended energy dispatch pattern by selecting, from the plurality of energy dispatch patterns, an energy dispatch pattern whose estimated net value is larger than the estimated net values of other energy dispatch patterns of the plurality of energy dispatch patterns and is larger than a configured threshold.

10. The system of claim 1, wherein the instructions, when executed by the at least one processor, cause the computing device to:

determine the one or more state variables of the one or more energy storage units based on the energy dispatch pattern; and determine the estimated marginal degradation of the one or more energy storage units based on the energy dispatch pattern.

11. The system of claim 1, wherein the instructions, when executed by the at least one processor, cause the computing device to:

receive, from a computing device associated with a wholesale energy market, the forecasted energy market data.

12. The system of claim 1, wherein the instructions, when executed by the at least one processor, cause the computing device to:

determine the estimated cost by calculating an opportunity cost associated with the estimated marginal degradation.

13. The system of claim 1, wherein the instructions, when executed by the at least one processor, cause the computing device to:

determine the estimated cost by calculating a replacement cost for replacing the estimated marginal degradation.

14. The system of claim 1, wherein the one or more state variables of the one or more energy storage units comprise temperatures of the one or more energy storage units within one or more enclosures for the one or more energy storage units.

15. The system of claim 1, wherein the instructions, when executed by the at least one processor, cause the computing device to determine the estimated marginal degradation by:

performing a search in a database that maps parameters of an energy dispatch pattern and temperatures of batteries to expected degrees of degradation.

16. The system of claim 1, wherein the environmental data for the one or more energy storage units comprises one or more of:

a forecasted ambient temperature for an area in which the one or more energy storage units are located; or a forecasted ambient humidity for an area in which the one or more energy storage units are located.

17. The system of claim 16, wherein the instructions, when executed by the at least one processor, cause the computing device to:

receive, from a computing device associated with weather forecasting, the environmental data.

18. A method comprising:

generating, by a computing device, a plurality of energy dispatch patterns for utilizing one or more energy storage units;

determining, for each energy dispatch pattern of the plurality of energy dispatch patterns, an estimated net value by:

determining, based on forecasted energy market data, an estimated value of the energy dispatch pattern;

determining, based on environmental data for the one or more energy storage units, one or more state variables of the one or more energy storage units;

determining, based on the one or more state variables, an estimated marginal degradation of the one or more energy storage units;

determining, based on the estimated marginal degradation, an estimated cost of the energy dispatch pattern; and calculating, based on the estimated value and the estimated cost, the estimated net value of the energy dispatch pattern;

generating, based on the estimated net value determined for each energy dispatch pattern of the plurality of energy dispatch patterns, a recommended energy dispatch pattern; and adjusting the one or more energy storage units to dispatch electricity according to the recommended energy dispatch pattern.

19. A non-transitory computer-readable medium storing instructions that, when executed by at least one processor, cause the at least one processor to:

generate a plurality of energy dispatch patterns for utilizing one or more energy storage units;

determine, for each energy dispatch pattern of the plurality of energy dispatch patterns, an estimated net value by:

determining, based on forecasted energy market data, an estimated value of the energy dispatch pattern;

determining, based on environmental data for the one or more energy storage units, one or more state variables of the one or more energy storage units;

determining, based on the one or more state variables, an estimated marginal degradation of the one or more energy storage units;

determining, based on the estimated marginal degradation, an estimated cost of the energy dispatch pattern; and calculating, based on the estimated value and the estimated cost, the estimated net value of the energy dispatch pattern;

generate, based on the estimated net value determined for each energy dispatch pattern of the plurality of energy dispatch patterns, a recommended energy dispatch pattern; and adjust the one or more energy storage units to dispatch electricity according to the recommended energy dispatch pattern.

* * * * *